US010195705B2

(12) United States Patent
Laber et al.

(10) Patent No.: US 10,195,705 B2
(45) Date of Patent: Feb. 5, 2019

(54) ELECTRIC POWER TOOL

(71) Applicant: Robert Bosch GmbH, Stuttgart (DE)

(72) Inventors: Sebastian Laber, Steinenbronn (DE); Heiko Bayer, Neuhausen (DE); Florian Esenwein, Leinfelden-Echterdingen (DE); Manfred Lutz, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 15/318,630

(22) PCT Filed: Apr. 14, 2015

(86) PCT No.: PCT/EP2015/058003
§ 371 (c)(1),
(2) Date: Dec. 13, 2016

(87) PCT Pub. No.: WO2015/192993
PCT Pub. Date: Dec. 23, 2015

(65) Prior Publication Data
US 2018/0161949 A1    Jun. 14, 2018

(30) Foreign Application Priority Data
Jun. 17, 2014 (DE) .......................... 10 2014 211 578

(51) Int. Cl.
*B24B 23/02* (2006.01)
*B23Q 11/00* (2006.01)
(Continued)

(52) U.S. Cl.
CPC ........ *B23Q 11/0092* (2013.01); *B24B 23/022* (2013.01); *B24B 23/028* (2013.01);
(Continued)

(58) Field of Classification Search
CPC ... B23Q 11/0092; B24B 23/022; B24B 47/26; B25F 5/001; H02K 7/104; H02K 7/145
(Continued)

(56) References Cited

U.S. PATENT DOCUMENTS 3,703,654 A * 11/1972 Karubian .................. B27B 5/38
30/369
5,337,862 A * 8/1994 Kuwahara ............ H02K 49/043
188/158
(Continued)

FOREIGN PATENT DOCUMENTS

CN        1295906 A      5/2001
CN     201159251 Y      12/2008
(Continued)

OTHER PUBLICATIONS

International Search Report corresponding to PCT Application No. PCT/EP2015/058003, dated Jul. 31, 2015 (German and English language document) (5 pages).

*Primary Examiner* — George Nguyen
(74) *Attorney, Agent, or Firm* — Maginot, Moore & Beck LLP

(57) ABSTRACT

An electric power tool includes an output shaft, drivable by an associated drive motor, and a brake apparatus for braking the output shaft rotating in the unpowered state of the associated drive motor. The output shaft is mounted in a rotatable manner in an associated housing and the brake apparatus has a magnetic-field brake unit with at least one first and one second brake element. The first brake element is arranged radially with respect to the output shaft in a rotationally fixed manner in the associated housing and includes at least one first and one second magnetic pole configured to generate a magnetic field that alternates in the circumferential direction of the output shaft. The second
(Continued)

brake element is magnetically conductive and rotationally connected to the output shaft via an activatable coupling device.

15 Claims, 5 Drawing Sheets

(51) Int. Cl.
*B25F 5/00* (2006.01)
*B24B 47/26* (2006.01)
*H02K 7/104* (2006.01)
*H02K 7/14* (2006.01)

(52) U.S. Cl.
CPC ............ *B24B 47/26* (2013.01); *B25F 5/001* (2013.01); *H02K 7/104* (2013.01); *H02K 7/145* (2013.01)

(58) Field of Classification Search
USPC .......................................... 451/353
See application file for complete search history.

(56) References Cited

U.S. PATENT DOCUMENTS

| | | | |
|---|---|---|---|
| 5,595,531 A * | 1/1997 | Niemela | B24B 23/03 451/357 |
| 6,948,597 B2 * | 9/2005 | Kuwahara | H02K 49/043 188/158 |
| 9,243,674 B2 * | 1/2016 | Esenwein | B23Q 11/0092 |
| 9,546,701 B2 * | 1/2017 | Wiker | F16D 63/006 |
| 2002/0066632 A1 * | 6/2002 | Kristen | B25D 16/003 192/17 C |
| 2013/0284551 A1 * | 10/2013 | Nadig | B23Q 11/0092 188/267 |
| 2014/0034434 A1 * | 2/2014 | Esenwein | B23Q 11/0092 188/267 |
| 2014/0069756 A1 * | 3/2014 | Esenwein | B25F 5/001 188/324 |
| 2014/0076678 A1 * | 3/2014 | Schadow | B25F 5/00 188/77 W |
| 2014/0124307 A1 * | 5/2014 | Esenwein | B24B 23/028 188/180 |
| 2015/0375357 A1 * | 12/2015 | Chen | B24B 21/16 451/303 |

FOREIGN PATENT DOCUMENTS

| | | |
|---|---|---|
| CN | 103189165 A | 7/2013 |
| DE | 10 2010 043 184 A1 | 5/2012 |
| DE | 10 2010 043 185 A1 | 5/2012 |
| DE | 10 2011 005 812 A1 | 9/2012 |
| JP | 2004-72851 A | 3/2004 |
| JP | 2006-181667 A | 7/2006 |
| JP | 2012-20392 A | 2/2012 |
| JP | 2014-39361 A | 2/2014 |

* cited by examiner

ELECTRIC POWER TOOL

This application is a 35 U.S.C. § 371 National Stage Application of PCT/EP2015/058003, filed on Apr. 14, 2015, which claims the benefit of priority to Serial No. DE 10 2014 211 578.7, filed on Jun. 17, 2014 in Germany, the disclosures of which are incorporated herein by reference in their entirety.

BACKGROUND

The present disclosure relates to an electric power tool with an output shaft drivable by an associated drive motor and with a brake apparatus for braking the output shaft rotating in the unpowered state of the associated drive motor, wherein the output shaft is rotatably mounted in an associated housing and the brake apparatus comprises a magnetic-field brake unit having at least one first and one second brake element.

An electric power tool of this type having a drivetrain and a magnetic-field brake unit is known from DE 10 2010 043 185 A1. This magnetic-field brake unit has two first brake elements, which are arranged rotatably in a housing associated with the electric power tool and which are formed in the manner of magnet rings, and also a second brake element, which is arranged non-rotatably between the two first brake elements and which is formed in the manner of a copper disc.

A disadvantage of this prior art is that the two first brake elements of the magnetic-field brake unit are relatively heavily mechanically loaded by their rotatable arrangement, whereby their service life can be reduced and therefore the product service life of the electric power tool as a whole can be reduced.

SUMMARY

One object of the disclosure is therefore to provide a new electric power tool having a brake apparatus which is reliable and robust and with which an extension of a corresponding service life can be achieved, such that an extension of a corresponding product service life of the electric power tool as a whole is made possible.

This problem is solved by an electric power tool having an output shaft drivable by an associated drive motor and having a brake apparatus for braking the output shaft rotating in the unpowered state of the associated drive motor, wherein the output shaft is rotatably mounted in an associated housing and the brake apparatus comprises a magnetic-field brake unit having at least one first and one second brake element. The first brake element is arranged radially with respect to the output shaft non-rotatably in the associated housing and is provided with at least one first and one second magnetic pole in order to generate a magnetic field that alternates in the peripheral direction of the output shaft. The second brake element is magnetically conductive and is rotatably connected to the output shaft via an activatable coupling device.

The disclosure thus makes it possible to provide an electric power tool having a brake apparatus which is reliable and robust and with which the first brake element is hardly mechanically loaded on account of its non-rotatable arrangement in the housing, and therefore an extended service life of the brake apparatus as such and also of the electric power tool as a whole can be achieved.

In accordance with one embodiment the activatable coupling device is designed, upon activation, to connect the second brake element to the rotating output shaft for conjoint rotation therewith in the unpowered state of the associated drive motor.

A brake apparatus that experiences little wear and that is stable can thus be provided.

The activatable coupling device is preferably designed, in the powered state of the associated drive motor, to enable a rotation of the output shaft relative to the second brake element.

A deactivation of the brake apparatus in the normal operation of the electric power tool can thus be achieved in an uncomplicated and reliable manner.

The magnetic-field brake unit is preferably formed in the manner of an eddy current brake.

A reliable and stable magnetic-field brake unit can thus be provided.

In accordance with one embodiment the first and second brake element are each formed in the manner of a segment of a ring, at least in part, wherein the first brake element is arranged in the region of an end face of the second brake element.

The disclosure thus enables a simple and space-saving arrangement of the first and second brake element in the housing of the electric power tool.

The first brake element is preferably formed in the manner of a permanent magnet ring surrounding the output shaft peripherally.

A robust and stable first brake element can thus be provided.

The second brake element is preferably formed in the manner of a ring, in particular an iron or copper ring, peripherally surrounding the output shaft.

An uncomplicated and economical second brake element can thus be provided.

The second brake element is preferably connected to a driving member associated with the activatable coupling device for conjoint rotation with said driving member, which, in the unpowered state of the associated drive motor, can be connected to the rotating output shaft for conjoint rotation therewith via a multiplicity of blocking members, in particular cylindrical blocking members.

The second brake element can thus be arranged non-rotatably in the housing in the unpowered state of the drive motor in a simple way.

In the region of the multiplicity of blocking members there is preferably arranged, on the output shaft, a driver connected to the output shaft for conjoint rotation therewith and associated with the activatable coupling device.

A driver can thus be provided which couples the second brake element to the output shaft when the coupling device is activated.

The driver preferably has an at least approximately polygonal outer periphery.

A simple and reliable driver of which the polygonal outer periphery forms a multiplicity of ramps for cooperation with the blocking members can thus be provided.

The driver is preferably coupled to the driving member via an actuator associated with the activatable coupling device, the multiplicity of blocking members being accommodated at least in part in said driving member.

The driver can thus be coupled to the driving member quickly and in an uncomplicated manner.

In accordance with one embodiment the actuator is connected to a drive element for conjoint rotation therewith for rotatably driving the output shaft, wherein the drive element is mounted with play on the output shaft, in order to enable a rotation of the output shaft relative to the drive element within a predefined angular range.

A relative rotation of the output shaft relative to the drive element can thus be enabled in a simple manner.

The driver, with rotating output shaft in the unpowered state of the associated drive motor, is preferably connectable to the driving member for conjoint rotation therewith via the multiplicity of blocking members by a torque reversal of the actuator relative to the rotating output shaft and a resultant relative rotation between driver and actuator.

The brake apparatus can thus be activated independently, i.e. without external actuation by a user, by means of a corresponding relative rotation.

In accordance with one embodiment the electric power tool is formed in the manner of an angle grinder.

The brake apparatus according to the disclosure can thus also be used in a simple manner in angle grinders.

Furthermore, the problem stated in the introduction is also solved by a modular brake apparatus for an electric power tool, which has an output shaft drivable by an associated drive motor and rotatably mounted in an associated housing, with a magnetic-field brake unit, which is provided with at least one first and one second brake element. The first brake element can be secured radially with respect to the output shaft non-rotatably in the associated housing and is provided with at least one first and one second magnetic pole in order to generate a magnetic field that alternates in the peripheral direction of the output shaft, and the second brake element is magnetically conductive and can be rotatably connected to the output shaft via an activatable coupling device.

BRIEF DESCRIPTION OF THE DRAWINGS

The disclosure will be explained in greater detail in the following description with reference to exemplary embodiments illustrated in the drawings, in which.

DETAILED DESCRIPTION

Figure 1:
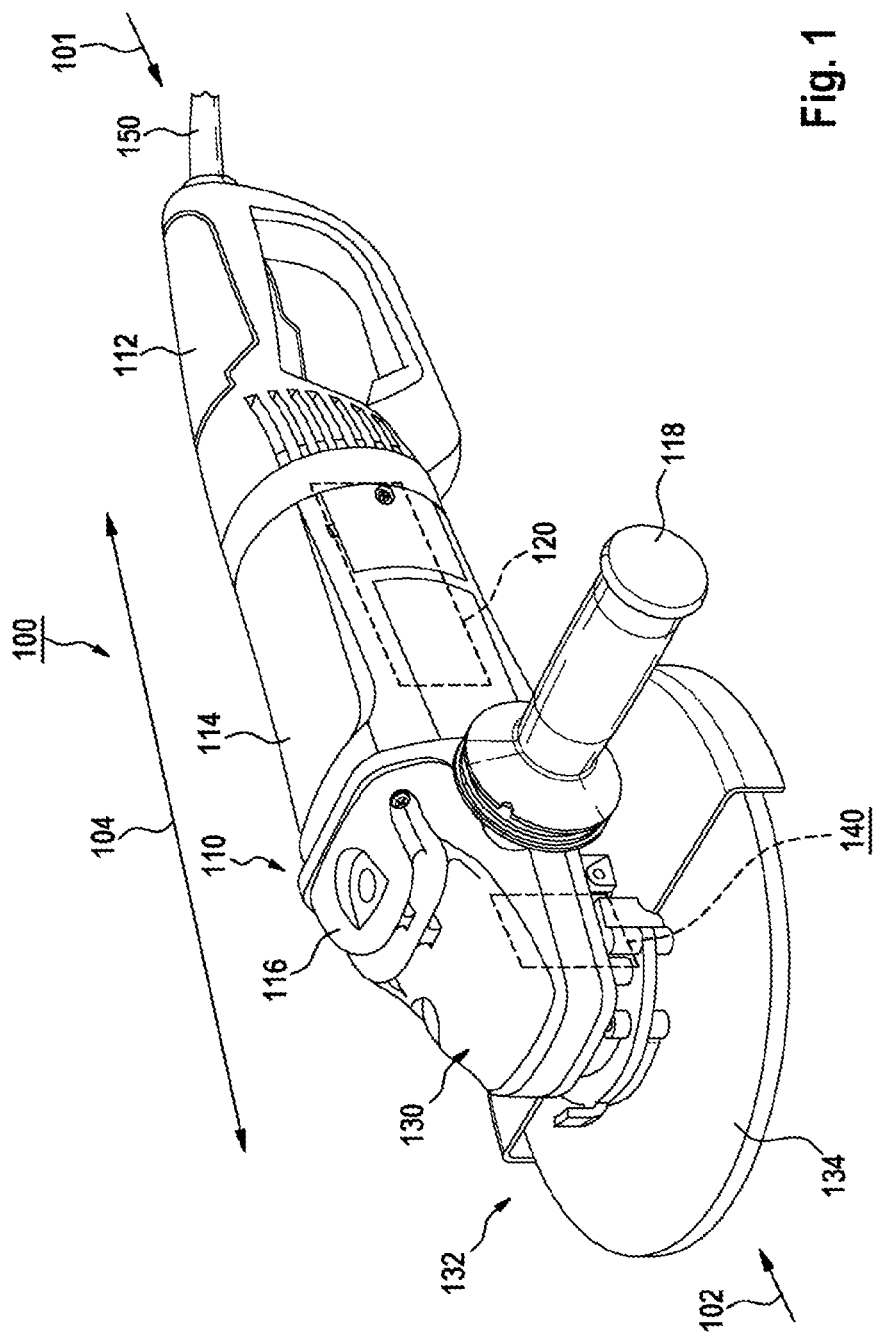
FIG. 1 shows a schematic view of an electric power tool with a brake apparatus in accordance with one embodiment.

FIG. 1 shows an electric power tool 100 formed as an angle grinder with a brake apparatus 140 in accordance with one embodiment. It should be noted that the electric power tool 100 is described merely by way of example as an angle grinder and not so as to limit the disclosure. Rather, the disclosure can be applied in the case of electric power tools, in particular portable electric power tools, which are fitted or can be fitted with a drive motor and the brake apparatus according to the disclosure. The term "portable electric power tool" is understood within the context of the disclosure to mean an electric power tool which can be transported by a user without use of a transport machine. In addition, the brake apparatus can be integrated in a modular manner in any electric power tool, for example via a plug connection.

Furthermore, the electric power tool 100 preferably has a mass less than 50 kg, preferably less than 20 kg, and particularly preferably less than 10 kg.

In a tool housing 110 associated with the angle grinder 100, a drive motor 120 for driving an output unit 130 is preferably provided. The drive motor 120 is preferably formed as an electronically commutated electric motor, but can also be any other electric motor. The output unit 130 preferably has an output shaft (210 in FIG. 2) which serves to drive an insertion tool 134, which is formed by way of example as a grinding wheel. For protection against grinding particles for example, the insertion tool 134 is preferably assigned a protective hood 132.

By way of illustration, the drive motor 120 is arranged in an associated motor portion 114 of the tool housing 110, and the output unit 130 is arranged in a transmission portion 116. The transmission portion 116 is arranged at a first axial end 102 of the angle grinder 100, or the tool housing 110, and is provided by way of illustration with an additional handle 118, which preferably extends transversely to a main direction of extension 104 of the angle grinder 100. A (main) handle 112 is preferably formed, at least in part, in the region of a second axial end 101 of the angle grinder 100 or of the tool housing 110 axially opposite the first axial end. In addition, a power cable 150 for mains-dependent power supply at least of the drive motor 120 is arranged at the second axial end 101, by way of example. However, a rechargeable power pack for mains-independent power supply at least of the drive motor 120 could also be arranged at the second axial end 101.

In accordance with one embodiment, the brake apparatus 140 associated with the angle grinder 100 is designed to brake the output shaft (210 in FIG. 2) of the output unit 130, which output shaft rotates in the unpowered state of the drive motor 120. Here, the brake apparatus 140 is preferably designed to be independently activated and deactivated, wherein the brake apparatus 140 is activated when the drive motor 120 is unpowered and is deactivated when the drive motor 120 is powered. The brake apparatus 140 preferably reduces a run-down time of the angle grinder 100, i.e. the period of time from switch-off of the drive motor 120 to a standstill of the insertion tool 134, to preferably a maximum of two to three seconds.

Figure 2:
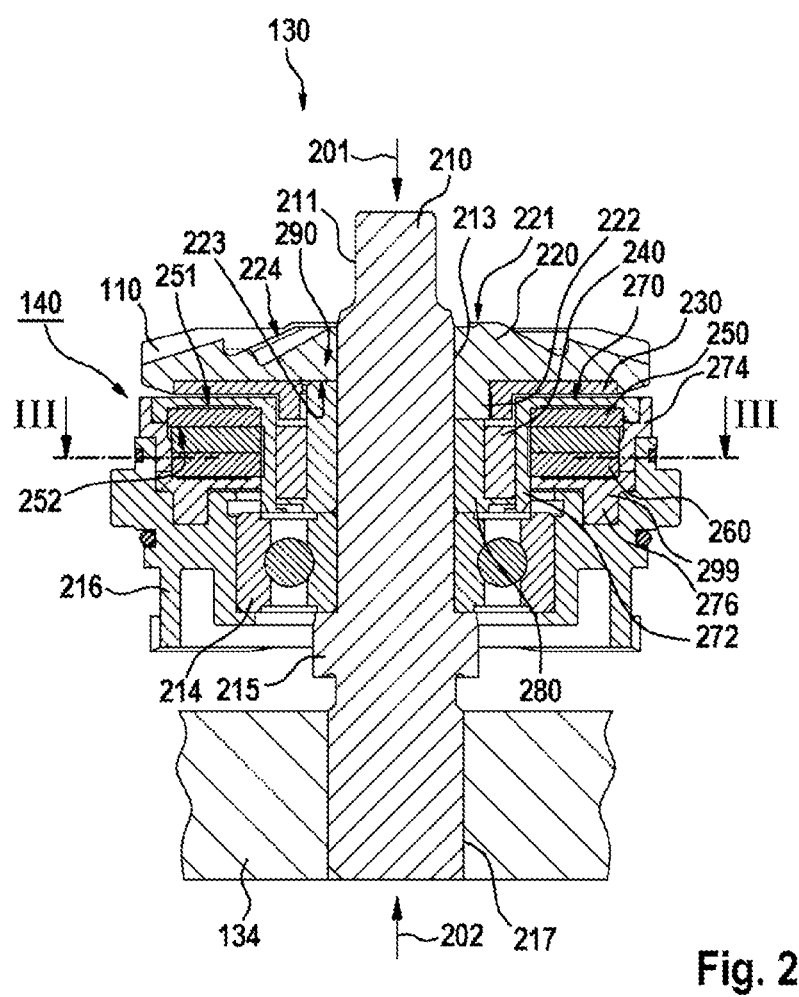
FIG. 2 shows a sectional view of the brake apparatus of FIG. 1.

FIG. 2 shows the output unit 130 of FIG. 1 with the output shaft 210. This has, at a first axial end 201, a first portion 211 for mounting in the tool housing 110, which by way of illustration becomes larger in steps in a second and third portion 213, 215 and by way of illustration becomes smaller again in a fourth portion 217 starting from the third portion 215 in the region of a second axial and 202 opposite the first axial end 201. The fourth portion 217 is preferably designed to accommodate the insertion tool 134.

The output shaft 210 is preferably rotatably mounted via at least one bearing element 214 in a housing termination element 216 formed by way of example as a bearing flange. Here, the bearing element 214 is preferably arranged on the second portion 213 of the output shaft 210 and is secured by the third portion 215 of said output shaft in the direction of the second axial end 202 of said output shaft.

A drive element 220 designed in the form of a transmission input gearwheel, formed by way of illustration in the manner of a crown gear, is preferably arranged in the region of the first axial end 201 of the output shaft 210, or at the second portion 213 thereof, preferably with play, but non-rotatably. The drive element 220 has, on a first end face 221 facing toward the first axial end 201 of the output shaft 210, a toothing 224 by way of example. A rotational movement can preferably be transferred from the drive motor 120 to the output shaft 210 and therefore to the insertion tool 134 via this toothing 224. On a second end face 223 of the drive element 220 opposite the first end face 221, there is preferably arranged at least one rotary driving element 222, which is preferably connected to the drive element 220 for conjoint rotation therewith and/or is molded thereon or is integrally formed therewith and is operatively connected to the brake apparatus 140.

In accordance with one embodiment the brake apparatus 140 has a magnetic-field brake unit 270, which is preferably formed in the manner of an eddy current brake and has at least one first and one second brake element 260, 250. The first brake element 260 is preferably arranged radially with respect to the output shaft 210 and preferably non-rotatably in the tool housing 110 or on the bearing flange 216.

By way of illustration, the first brake element 260 is arranged in a receptacle 299, which is associated with the bearing flange 216 or is provided thereon and which is preferably formed in two parts. A first receiving element 276 preferably supports the first brake element 260 axially, and a second receiving element 274 supports the first brake element 260 radially outwardly. The first brake element 260 is preferably provided with at least one first and one second magnetic pole (362, 364 in FIG. 3) in order to generate a magnetic field (420 in FIG. 4) that alternates in the peripheral direction of the output shaft 210. The first brake element 260 is preferably formed in the manner of a segment of a ring, at least in part, and is preferably formed in the manner of a permanent magnet ring peripherally surrounding the output shaft 210. It should be noted that the embodiment of the first brake element 260 as a magnet ring is given merely by way of example, and the first brake element 260 can also be formed from a multiplicity of segments of a ring. Here, each segment of a ring of the multiplicity of segments of a ring can form a magnetic pole (362, 364 in FIG. 3). In addition, the first brake element 260 is preferably arranged in the region of an end face 252 the second brake element 250, by way of illustration on the end face 252 of the second brake element 250 facing toward the second axial end 202 of the output shaft 210.

In accordance with one embodiment the second brake element 250 is magnetically conductive and is preferably formed in the manner of a segment of a ring, at least in part. The second brake element 250 is preferably formed in the manner of a ring, in particular an iron or copper ring, surrounding the output shaft 210 peripherally.

The second brake element 250 is preferably rotatably connected to the output shaft 210 via an activatable coupling device 290. This coupling device 290 is preferably designed, in the event of activation, to connect the second brake element 250 to the rotating output shaft 210 for conjoint rotation therewith in the unpowered state of the associated drive motor 120, i.e. in the case of braking of the electric power tool 100 of FIG. 1, and preferably to enable a rotation of the output shaft 210 relative to the second brake element 250 in the powered state of the drive motor 120 of FIG. 1, i.e. in normal operation or freewheeling of the electric power tool 100 of FIG. 1.

In accordance with one embodiment the coupling device 290 is assigned a driving member 272, which can be connected to the rotating output shaft 210 for conjoint rotation therewith via a multiplicity of blocking members 240, in particular cylindrical blocking members 240, in the unpowered state of the drive motor 120 of FIG. 1. The driving member 272 is preferably connected to the second brake element 250 for conjoint rotation therewith.

In addition, the coupling device 290 is preferably assigned a driver 280, which is arranged on the output shaft 210, preferably in the region of the multiplicity of blocking members 240 and is connected to the output shaft 210 for conjoint rotation therewith. By way of illustration, the driver 280 has an at least approximately polygonal outer periphery and is preferably coupled to the driving member 272 via an actuator 230 associated with the coupling device 290. In accordance with one embodiment the driving member 272 and the first and second receiving element 276, 274 of the receptacle 299 are formed as yoke elements of the magnetic-field brake unit 270.

The multiplicity of blocking members 240 is preferably accommodated at least in part in the actuator 230. Furthermore, the actuator 230 is preferably connected to the drive element 220 for conjoint rotation therewith to rotatably drive the output shaft 210. Here, the drive element 220, as described above, is connected with play to the output shaft 210 in order to enable a rotation of the output shaft 210 relative to the drive element 220 within a predefined angular range of preferably at least 5 to 15 degrees.

In accordance with one embodiment the driver 280 with rotating output shaft 210 in the unpowered state of the drive motor 120 of FIG. 1 is rotated relative to the rotating output shaft 210 by a torque reversal of the actuator 230 in the case of braking of the electric power tool 100 of FIG. 1. Due to a resultant relative rotation between the driver 280 and the actuator 230, the driver 280 is connected to the driving member 272 for conjoint rotation therewith via the multiplicity of blocking members 240.

Figure 3:
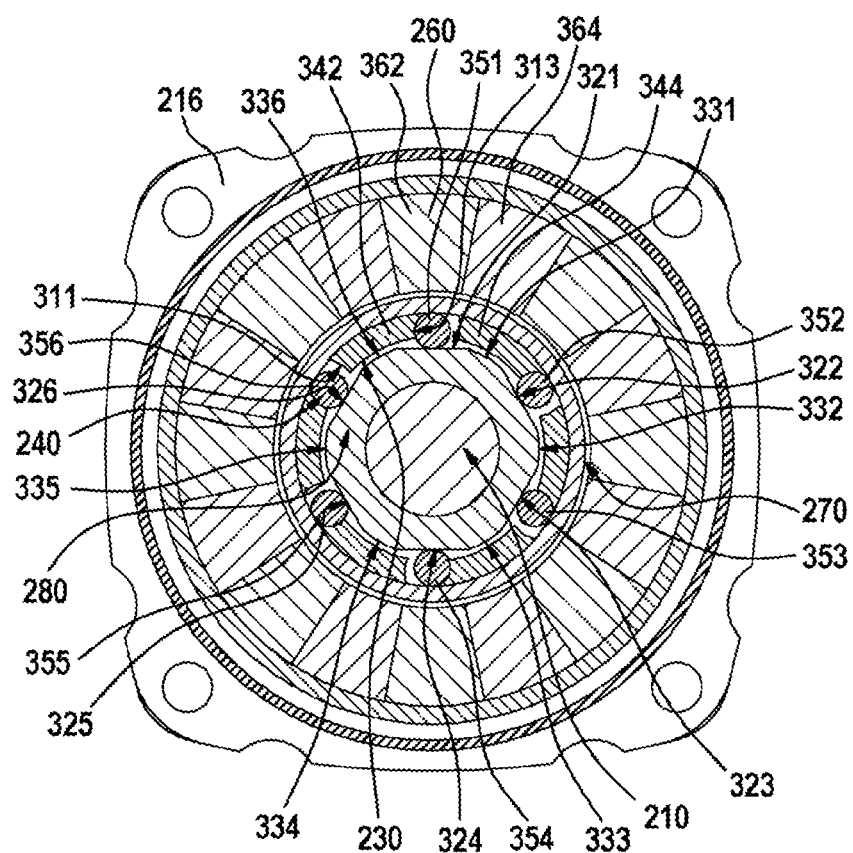
FIG. 3 shows a sectional view of the brake apparatus of FIG. 1, as viewed along a line of section III-III of FIG. 2.

FIG. 3 shows an exemplary construction of the magnetic-field brake unit 270 of FIG. 2, formed as an eddy current brake and also referred to hereinafter as such. Here, the coupling device 290 of the eddy current brake 270 is constructed in the manner of a spindle lock. Accordingly, the driver 280 has a polygonal outer periphery with, by way of example, six flattened portions 321, 322, 323, 324, 325, 326 for the arrangement of at least one and, by way of illustration, six associated blocking members 351, 352, 353, 354, 355, 356 of the multiplicity of blocking members 240. A rounded edge 331, 332, 333, 334, 335, 336 of the driver 280 is formed between each of the flattened portions 321 to 326.

By way of illustration, each blocking member 351 to 356 is surrounded between two claw-like actuating arms adjacent in the peripheral direction of the actuator 230. The arrangement of each of the blocking members 351 to 356 between two actuating arms will be described hereinafter by way of example on the basis of the blocking member 351. This is arranged by way of illustration between a first and a second actuating arm 342, 344, which each have a first and second peripheral end 311, 313. By way of illustration, the blocking member 351 is arranged in the region of the second peripheral end 313 of the first actuating arm 342.

Furthermore, FIG. 3 shows the first brake element 260 preferably formed as a permanent magnet ring with at least one first and one second magnetic pole 362, 364. By way of illustration, a multiplicity of first and second magnetic poles 362, 364 are arranged in alternation in the peripheral direction of the coupling device 290. The magnetic poles 362, 364 thus form a magnetic field (420 in FIG. 4) that alternates in the peripheral direction of the coupling device 290.

Figure 4:
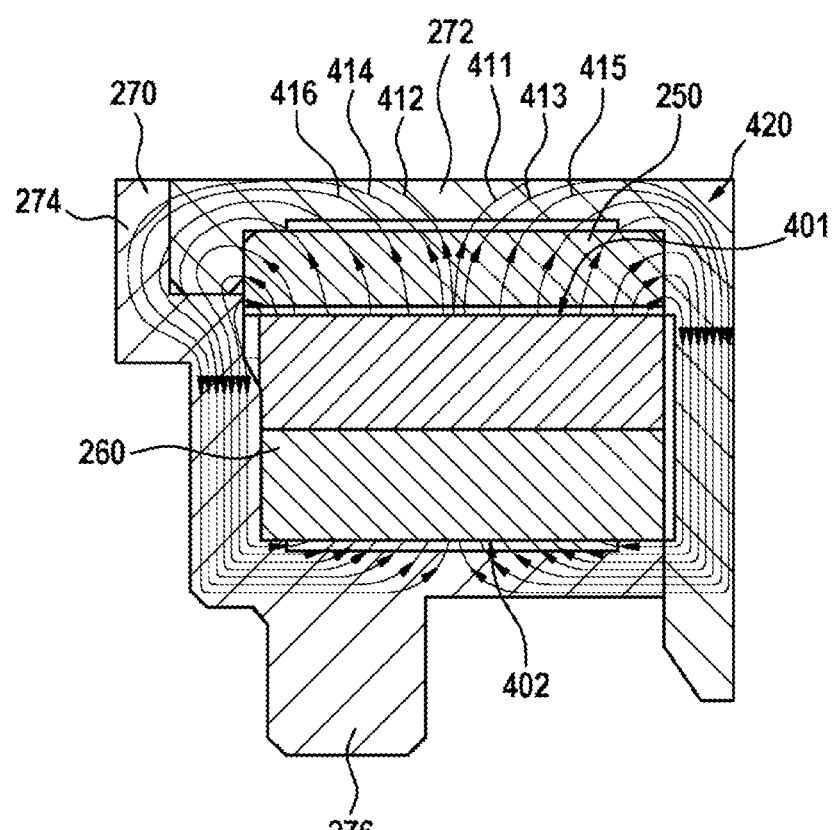
FIG. 4 shows a schematic view of an exemplary course of magnetic flux of the brake apparatus of FIG. 1 to FIG. 3.

FIG. 4 shows an exemplary magnetic field 420 of the brake apparatus 140 of FIG. 2. This magnetic field 420 is illustrated by a multiplicity of magnetic field lines 411, 412, 413, 414, 415, 416, which are generated by the magnetic field brake unit 270 in the case of braking of the electric power tool 100 of FIG. 1.

The magnetic field lines 411, 413, 415 exit at a first end face 401, by way of illustration an upper side, of the first brake element 260, are conducted via the magnetic field brake unit 270, and enter the first brake element 260 again on a second end face 402 or an underside of said first brake element, opposite the first end face 401. Here, the magnetic flux 420 runs via the second brake element 250 and also the driving member 272 and the first and second receiving element 274, 276, which serve as yoke elements.

The magnetic field lines 412, 414, 416 exit at the first end face 401 of the first brake element 260, run by way of illustration through the second brake element 250 and also through the first and second receiving element 274, 276, and enter the first brake element 260 again on the second side 402. The magnetic field lines 411, 413, 415 exit similarly to the magnetic field lines 412, 414, 416 on the first end face 401 of the first brake element 260, run by way of illustration through the second brake element 250 and also through the second receiving element 276, before they enter the first brake element 260 again on the second side 402.

Figure 5:
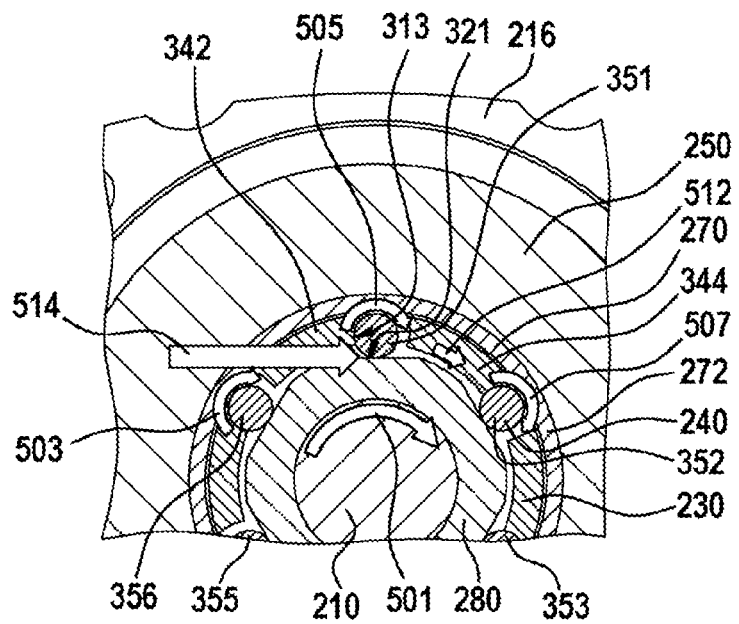
FIG. 5 shows a plan view of the brake apparatus of FIG. 1 to FIG. 3 in normal operation of the electric power tool of FIG. 1.

FIG. 5 shows the brake apparatus 140 from FIG. 2 when the electric power tool 100 of FIG. 1 is freewheeling, the blocking elements 351 to 354 being positioned in the electric power tool by the actuator 230 in such a way that they do not contact the driver 280 in a region 514 or can roll over said driver. With a rotational movement of the output shaft 210 in the direction of an arrow 501, the blocking members 351 to 354 roll over the driver 280 similarly to a rolling bearing in the direction of the arrows 503, 505, 507, such that the driver also rotates with the output shaft 210 in the direction of an arrow 512. The driver 280, over which the blocking members 351 to 354 also roll, therefore does not rotate, such that the second brake element 250 connected to the driver 280 for conjoint rotation therewith also does not rotate. Since there is no relative movement between the first and second brake element 260, 250, no eddy current is generated, whereby no braking torque can be generated.

Figure 6:
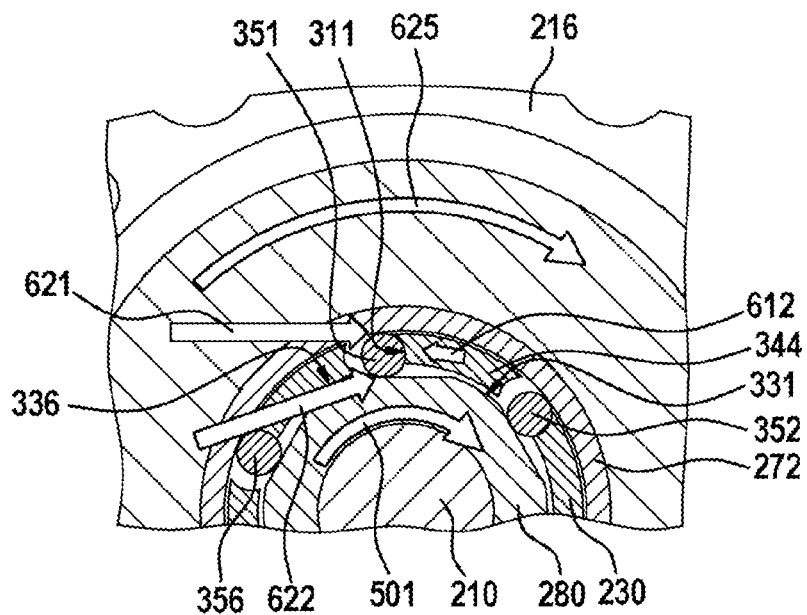
FIG. 6 shows a plan view of the brake apparatus of FIG. 1 to FIG. 3 in the case of braking of the electric power tool of FIG. 1.

FIG. 6 shows the brake apparatus 140 of FIG. 2 in the event of braking of the electric power tool 100 of FIG. 1, in which the brake apparatus 140 is preferably automatically activated by a deactivation of the drive motor 120 of FIG. 1. With a deactivation of this type or the occurrence of the braking situation, the actuator 230 preferably rotates relative to the driver 280 on account of an occurring torque reversal in the direction of an arrow 612.

The torque reversal is preferably created in a braking situation or with the deactivation of the drive motor 120 of FIG. 1 on account of a moment of inertia of the insertion tool 134 of FIG. 1 and a frictional torque of the drive motor 120. Here, the blocking members 351 to 356 are temporarily obstructed by the actuator 230 and thus pass into the regions of the rounded edges 331 to 336 and are clamped there between the driver 280 and the driving member 272. Here, the blocking member 351 is clamped for example between a first and second region 621, 622. This also applies analogously to the other blocking members 352 to 356.

As a result of this clamping, the driving member 272 is coupled to the driver 280 and therefore to the output shaft 210 for conjoint rotation therewith via the actuator 230 so that the second brake element 250 arranged non-rotatably in the driving member 272 also rotates with the output shaft 210, as indicated by an arrow 625. The resultant relative movement between the second brake element 250 and the first brake element 260 arranged non-rotatably in the electric power tool 100 of FIG. 1 thus leads to the generation of magnetic eddy currents, which form a braking torque, which delays or brakes the second braking element 250 and therefore the output shaft 210.

The invention claimed is:

1. An electric power tool comprising:
an output shaft drivable by an associated drive motor; and
a brake apparatus for braking the output shaft rotating in an unpowered state of the associated drive motor,
wherein the output shaft is rotatably mounted in an associated housing,
wherein the brake apparatus has a magnetic-field brake unit having at least one first and one second brake element,
wherein the first brake element is arranged radially with respect to the output shaft non-rotatably in the associated housing and includes at least one first and one second magnetic pole configured to generate a magnetic field that alternates in the peripheral direction of the output shaft, and
wherein the second brake element is magnetically conductive and is rotatably connected to the output shaft via an activatable coupling device.

2. The electric power tool as claimed in claim 1, wherein the activatable coupling device is configured, upon activation, to connect the second brake element in the unpowered state of the associated drive motor to the rotating output shaft for conjoint rotation therewith.

3. The electric power tool as claimed in claim 1, wherein the activatable coupling device is configured to enable a rotation of the output shaft relative to the second brake element in a powered state of the associated drive motor.

4. The electric power tool as claimed in claim 1, wherein the magnetic-field brake unit is an eddy current brake.

5. The electric power tool as claimed in claim 1, wherein:
the first and second brake element are each formed as a segment of a ring, at least in part, and
the first brake element is located in a region of an end face of the second brake element.

6. The electric power tool as claimed in claim 1, wherein the first brake element is a permanent magnet ring peripherally surrounding the output shaft.

7. The electric power tool as claimed in claim 1, wherein the second brake element is a ring, peripherally surrounding the output shaft.

8. The electric power tool as claimed in claim 1, wherein the second brake element is connected to a driving member associated with the activatable coupling device for conjoint rotation with the driving member, which can be connected to the rotating output shaft for conjoint rotation therewith via a multiplicity of blocking members, in the unpowered state of the associated drive motor.

9. The electric power tool as claimed in claim 8, wherein a driver connected to the output shaft for conjoint rotation therewith and associated with the activatable coupling device is arranged on the output shaft in a region of the multiplicity of blocking members.

10. The electric power tool as claimed in claim 9, wherein the driver has an at least approximately polygonal outer periphery.

11. The electric power tool as claimed in claim 9, wherein the driver is coupled via an actuator associated with the activatable coupling device to the driving member, in which the multiplicity of blocking members is accommodated at least in part.

12. The electric power tool as claimed in claim 11, wherein:
- the actuator is connected to a drive element for conjoint rotation therewith for rotatably driving the output shaft, and
- the drive element is mounted with play on the output shaft in order to enable a rotation of the output shaft relative to the drive element within a predefined angular range.

13. The electric power tool as claimed in claim 12, wherein the driver with rotating output shaft in the unpowered state of the associated drive motor, is connectable to the driving member for conjoint rotation therewith by a torque reversal of the actuator relative to the rotating output shaft and a resultant relative rotation between driver and actuator via the multiplicity of blocking members.

14. The electric power tool as claimed in claim 1, wherein the electric power tool is an angle grinder.

15. A modular brake apparatus for an electric power tool, comprising:
- an output shaft drivable by an associated drive motor and rotatably mounted in an associated housing;
- a magnetic-field brake unit including at least one first and one second brake element, the first brake element securable radially with respect to the output shaft non-rotatably in the associated housing and including at least one first and one second magnetic pole in order to generate a magnetic field that alternates in the peripheral direction of the output shaft, and the second brake element is magnetically conductive and is connectable rotatably to the output shaft via an activatable coupling device.

* * * * *